(12) United States Patent
Megawa et al.

(10) Patent No.: US 6,642,993 B2
(45) Date of Patent: Nov. 4, 2003

(54) IMAGE PROCESSING DEVICE AND METHOD FOR CONTROLLING THE SAME

(75) Inventors: Shunichi Megawa, Yokohama (JP); Takahiro Fuchigami, Yokosuka (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 10/026,720

(22) Filed: Dec. 27, 2001

(65) Prior Publication Data

US 2003/0123033 A1 Jul. 3, 2003

(51) Int. Cl.$^7$ .................. G03B 27/00; G03B 27/32; G03B 27/52
(52) U.S. Cl. .................. 355/18; 355/32; 355/41
(58) Field of Search .................. 355/18, 32, 40–41, 355/35; 358/518, 474; 382/293

(56) References Cited

U.S. PATENT DOCUMENTS

| | | | |
|---|---|---|---|
| 4,953,014 A | | 8/1990 | Takaragi .................. 358/77 |
| 5,321,529 A | * | 6/1994 | Funada .................. 358/500 |
| 6,137,921 A | * | 10/2000 | Suzuki et al. .................. 382/296 |
| 6,418,281 B1 | * | 7/2002 | Ohki .................. 399/49 |
| 2002/0159106 A1 | | 10/2002 | Fuchigami et al. |
| 2002/0171854 A1 | | 11/2002 | Yamamoto et al. |
| 2003/0025926 A1 | | 2/2003 | Fuchigami et al. |

FOREIGN PATENT DOCUMENTS

JP  1-109966  4/1989

* cited by examiner

*Primary Examiner*—Henry Hung Nguyen
(74) *Attorney, Agent, or Firm*—Foley & Lardner

(57) ABSTRACT

Plural line sensors are arranged parallel to each other in a predetermined order and with a predetermined interval, and they read different lines on a manuscript respectively. A delay module outputs an image signal output from at least one of the plural line sensors with a delay for a number of lines according to a number of pixels which corresponds to shifts of reading positions of the plural line sensors. An ahead-reading signal acquiring module outputs the image signal acquired from at least one line sensor other than a last stage line sensor of the plural line sensors as an ahead-reading signal. The image processing device outputs the image signal wherein the shifts of the reading positions of the plural line sensors are corrected by the delay module, and outputs the ahead-reading signal acquired by the ahead-reading signal acquiring module.

12 Claims, 4 Drawing Sheets

IMAGE PROCESSING DEVICE AND METHOD FOR CONTROLLING THE SAME

BACKGROUND OF THE INVENTION

1. Field of the Invention

The present invention relates to an image processing device and a controlling method thereof, and particularly to the image processing device and the controlling method thereof which result from improving an inter-line process of a read image signal from plural line sensors arranged parallel to each other in a colored-image processing device such as a copying machine or a scanner.

2. Description of the Related Art

Conventionally, concerning a colored-image processing device such as a copying machine or a scanner, it has been considered necessary that respective reading drives of the plural line sensors are controlled at different timings when the image on a manuscript is read by using the plural line sensors for RGB arranged parallel to each other.

As a technique that meets these requirements, there has been known, for example, a method disclosed in Japanese Patent No. 2632871 (refer to Jpn. Pat. Appln. KOKAI Publication No. 1-109966; it will be indicated as Document 1 below).

That is, in the method disclosed in Document 1, it is designed so that the reading timings of the respective line sensors will be controlled by implementing an interpolation process on image signals (RGB signals) arranged parallel to each other and output from three line sensors that read different lines on a manuscript in accordance with reading magnifications of the manuscript.

In this case, the method disclosed in Document 1 is designed so that outputs from the respective line sensors will be made to synchronize in all channels. Therefore, a line memory for three RGB line signals becomes necessary.

That is, if the outputs from the respective line sensors are made to synchronize in all channels in this manner, when, for example, reference of plural lines is necessary for formation of a distinction signal, a filter process and the like at the latter step, the line memory for three RGB line signals becomes necessary even when only one line signal is needed since extraction is implemented among signals of the plural lines synchronized with the line signal.

However, in this case, there is a problem that the capacity of the line memory for the line signals that are not used for the reference is wasted since only one line signal is needed.

BRIEF SUMMARY OF THE INVENTION

An object of the present invention is to solve the above-mentioned problems that conventional techniques have, and to provide an image processing device and a controlling method thereof whose image reproducibility can be improved by implementing a necessary reference process by using at least one line signal as an ahead-reading signal when reading an image on a manuscript by using plural RGB line sensors arranged parallel to each other so that the capacity of a used memory can be mitigated while a substantially wider area can be referred to.

In order to accomplish the above-mentioned objects, according to a first aspect of the present invention, there is provided an image processing device comprising:

plural line sensors arranged parallel to each other in a predetermined order and with a predetermined interval, which read different lines on a manuscript, respectively;

a delay module which outputs an image signal output from at least one of the plural line sensors with a delay for a number of lines according to a number of pixels which corresponds to shifts of reading positions of the plural line sensors; and an ahead-reading signal acquiring module which acquires the image signal output from at least one line sensor other than a last stage line sensor of the plural line sensors as an ahead-reading signal, wherein the image processing device outputs the image signal wherein the shifts of the reading positions of the plural line sensors are corrected by the delay module, and outputs the ahead-reading signal acquired by the ahead-reading signal acquiring module.

Moreover, according to a second aspect of the present invention, there is provided the image processing device according to the first aspect, wherein the plural line sensors are arranged so that they can acquire desired signals as the ahead-reading signal output by the ahead-reading signal acquiring module.

Moreover, according to a third aspect of the present invention, there is provided the image processing device according to the first aspect further comprising a line interpolation module which implements line interpolation to the image signal output from at least one of the plural line sensors in correspondence with a change of the shifts of the reading position of the plural line sensors according to a reading magnification value of the manuscript.

Moreover, according to a fourth aspect of the present invention, there is provided the image processing device according to the first aspect, wherein the delay module includes a first delay module which outputs an image signal output from at least one line sensor other than the last stage line sensor of the plural line sensors with a delay for a number of lines according to the number of pixels which corresponds to the shifts of reading positions of the plural line sensors; and the ahead-reading signal acquiring module acquires the ahead-reading signal from the first delay module while including an ahead-reading signal plural-line reference module which enables to refer to plural lines of the acquired ahead-reading signal.

In order to accomplish the above-mentioned objects, according to a fifth aspect of the present invention, there is provided an image processing device comprising:

plural line sensors arranged parallel to each other in a predetermined order and with a predetermined interval, which read different lines on a manuscript, respectively;

delay means for outputting an image signal output from at least one of the plural line sensors with a delay for a number of lines according to a number of pixels which corresponds to shifts of reading positions of the plural line sensors;

ahead-reading signal acquiring means for acquiring the image signal output from at least one line sensor other than a last stage line sensor of the plural line sensors as an ahead-reading signal; and reading position shift correcting means for correcting the shifts of reading positions of the plural line sensors based on the image signal delayed by the delay means and the ahead-reading signal acquired by the ahead-reading signal acquiring means.

Moreover, according to a sixth aspect of the present invention, there is provided the image processing device according to the fifth aspect, wherein the plural line sensors are arranged so that they can acquire desired signals as the ahead-reading signal output by the ahead-reading signal acquiring means.

Moreover, according to a seventh aspect of the present invention, there is provided the image processing device according to the fifth aspect further comprising line interpolation means for implementing line interpolation to the image signal output from at least one of the plural line sensors in correspondence with a change of the shifts of the reading position of the plural line sensors according to a reading magnification value of the manuscript.

Moreover, according to an eighth aspect of the present invention, there is provided the image processing device according to the fifth aspect, wherein the delay means includes first delay means which outputs an image signal output from at least one line sensor other than the last stage line sensor of the plural line sensors with a delay for a number of lines according to the number of pixels which corresponds to the shifts of reading positions of the plural line sensors; and the ahead-reading signal acquiring means acquires the ahead-reading signal from the first delay means while including ahead-reading signal plural-line reference means for enabling reference to plural lines of the acquired ahead-reading signal.

In order to accomplish the above-mentioned objects, according to a ninth aspect of the present invention, there is provided a controlling method of an image processing device comprising plural line sensors arranged parallel to each other in a predetermined order and with a predetermined interval, which read different lines on a manuscript, respectively, comprising:

outputting an image signal output from at least one of the plural line sensors with a delay for a number of lines according to a number of pixels which corresponds to shifts of reading positions of the plural line sensors;

acquiring the image signal output from at least one line sensor other than a last stage line sensor of the plural line sensors as an ahead-reading signal; and outputting the image signal wherein the shifts of the reading positions of the plural line sensors are corrected and the ahead-reading signal.

Moreover, according to a tenth aspect of the present invention, there is provided the controlling method of the image processing device according to the ninth aspect, wherein the plural line sensors are arranged so that they can acquire desired signals as the ahead-reading signal.

Moreover, according to an eleventh aspect of the present invention, there is provided the controlling method of the image processing device according to the ninth aspect further comprising:

implementing line interpolation to the image signal output from at least one of the plural line sensors in correspondence with a change of the shifts of the reading position of the plural line sensors according to a reading magnification value of the manuscript.

Moreover, according to a twelfth aspect of the present invention, there is provided the controlling method of the image processing device according to the ninth aspect, wherein the delay is performed by a first delay element which outputs an image signal output from at least one line sensor other than the last stage line sensor of the plural line sensors with a delay for a number of lines according to the number of pixels which corresponds to the shifts of reading positions of the plural line sensors; and the ahead-reading signal acquisition is performed by acquiring the ahead-reading signal from the first delay element while including an ahead-reading signal plural-line reference element which enables reference to plural lines of the acquired ahead-reading signal.

Corresponding Embodiments and Operations

The above first, fifth, and ninth aspects correspond to a first embodiment which will be described below.

In these aspects, by implementing a necessary reference process by using the image signal output from at least one line sensor other than the last stage line sensor of the plural line sensors as an ahead-reading signal, the capacity of a used line memory can be mitigated while a substantially wider area can be referred to. As a result, referring to the wider area can be implemented with a lower cost so that image reproducibility is improved.

The above second, sixth, and tenth aspects correspond to the first embodiment which will be described below.

In these aspects, in addition to the first, fifth, and ninth aspects above, by arranging the plural line sensors so that the reading position of the signal that is desired to be ahead-read will be at the head, referring to the wider area can be implemented with lower cost concerning the desired signal as a result. Therefore, the image reproducibility is further improved.

The above third, seventh, and eleventh aspects correspond to a second embodiment which will be described below.

In these aspects, in addition to the first, fifth, and ninth aspects above, the area with the same width can always be referred to with lower cost regardless of the magnification during changing magnification of a scanner so that the reproducibility of the area image improves.

The above fourth, eighth, and twelfth aspects correspond to third and fourth embodiments which will be described below.

In these aspects, in addition to the first, fifth, and ninth aspects above, it becomes possible to refer to the wider area with less memory by commonly using the delay memory for adjusting position as the memory for referring to the area. Therefore, referring to a further wider area can be implemented with lower cost so that the image reproducibility improves.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention.

DETAILED DESCRIPTION OF THE INVENTION

Reference will now be made in detail to the presently preferred embodiments of the invention as illustrated in the accompanying drawings, in which like reference numerals designate like or corresponding parts.

First Embodiment

Hereinafter, an explanation will be given of a first embodiment of the present invention with reference to the accompanying drawings.

Figures 1, 2:
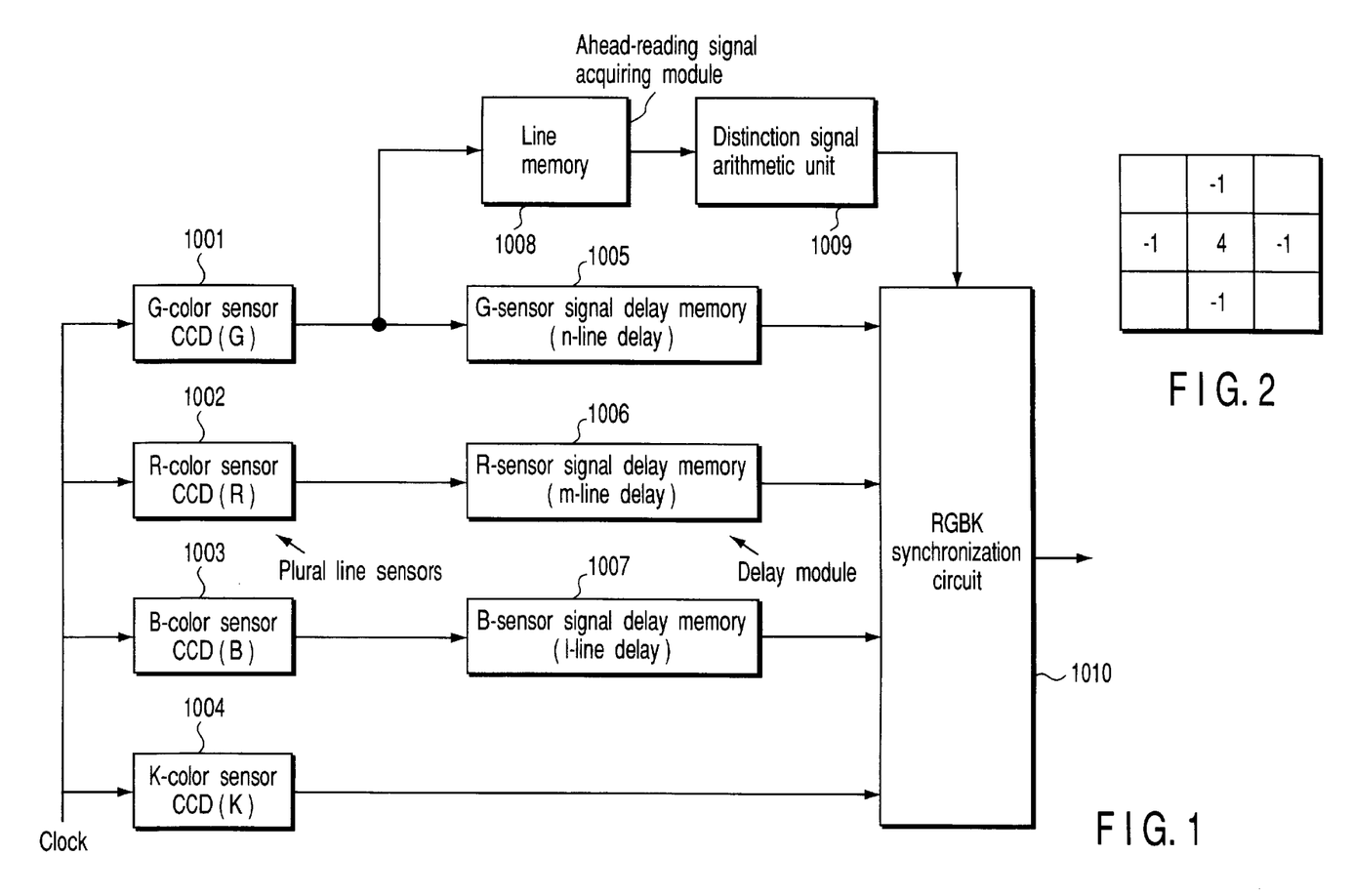
FIG. 1 is a block diagram showing a structure of a main portion of an image processing device according to a first embodiment of the present invention.
FIG. 2 is a matrix showing an example of an edge detection filter used for a distinction signal arithmetic unit in FIG. 1.

FIG. 1 is a block diagram showing a structure of a main portion of an image processing device according to the first embodiment of the present invention.

In FIG. 1, reference numeral 1001 indicates a green (G) color sensor.

Moreover, reference numeral 1002 indicates a red (R) color sensor.

Moreover, reference numeral 1003 indicates a blue (B) color sensor.

Moreover, reference numeral 1004 indicates a monochrome (K) color sensor.

It is assumed that the G-color sensor 1001, the R-color sensor 1002, the B-color sensor 1003, and the K-color sensor 1004 are respectively arranged, for example, at predetermined positions in a main body of a scanner that is not shown in the figures, in a predetermined order, with predetermined intervals, and parallel to each other, and they include, for example, a CCD line sensor that is made of charge coupled devices and an analog-to-digital converter for converting an analog signal from each CCD line sensor into a digital signal.

Then, the G-color sensor 1001, the R-color sensor 1002, the B-color sensor 1003, and the K-color sensor 1004 are to function as plural line sensors for respectively reading different lines on a manuscript that is not shown in the figures, and are driven by clocks supplied from outside with characteristics being the same as each other.

Moreover, in FIG. 1, reference numeral 1005 indicates a G-sensor signal delay memory of an n-line connected to an output end of the G-color sensor 1001.

Moreover, reference numeral 1006 indicates an R-sensor signal delay memory of an m-line connected to an output end of the R-color sensor 1002.

Moreover, reference numeral 1007 indicates a B-sensor signal delay memory of an 1-line connected to an output end of the B-color sensor 1003.

The G-sensor signal delay memory 1005, the R-sensor signal delay memory 1006, and the B-sensor signal delay memory 1007 are to function as a delay module which outputs an image signal output from at least one line sensor among the plural line sensors with a delay of a number of the lines (here, it is the number of n-, m-, and l-lines in the respective delay memories, and for example, they are regulated as n=24, m=16, and l=8) according to a number of pixels that correspond to shifts of the reading positions of the plural line sensors that are regulated by the arrangement interval of the plural line sensors.

Besides, as the G-sensor signal delay memory 1005, the R-sensor signal delay memory 1006, and the B-sensor signal delay memory 1007, concretely, there can be used, for example, a delay module composed of a FIFO memory as disclosed in above-mentioned Document 1 and a selector and the like for selecting which part of sensor line data in the FIFO memory is to be output at the latter step included therein.

Moreover, in FIG. 1, reference numeral 1008 indicates a line memory connected to the output end of the G-color sensor 1001.

The line memory 1008 functions as an ahead-reading signal acquiring module which acquires the image signal output from at least one line sensor besides the line sensor at the last step among the plural line sensors (the K-color sensor 1004 in this case) as an ahead-reading signal.

Moreover, in FIG. 1, reference numeral 1009 indicates a distinction signal arithmetic unit connected to the output end of the line memory 1008.

The distinction signal arithmetic unit 1009 generates a distinction signal as will be described later on the basis of the image signal from the line memory 1008.

Moreover, in FIG. 1, reference numeral 1010 indicates an RGBK synchronization circuit connected to the G-sensor signal delay memory 1005, the R-sensor signal delay memory 1006, the B sensor signal delay memory 1007, and the respective output ends of the K-color sensor 1004 while being connected to the output end of the distinction signal arithmetic unit 1009.

The RGBK synchronization circuit 1010 takes synchronization for each pixel of the respective RGBK image signals from the G-sensor signal delay memory 1005, the R-sensor signal delay memory 1006, the B-sensor signal delay memory 1007, and the respective output ends of the K-color sensor 1004 while outputting RGBK synchronized signal lines in a line unit resulting from adding the signal from the output end of the distinction signal arithmetic unit 1009 as a header to the synchronized signal in each pixel unit.

In the image processing device according to the first embodiment of the present invention that is composed as above, the output from the G-color sensor 1001 is stored to the line memory 1008 as the ahead-reading signal before being subjected to taking synchronization at the RGBK synchronization circuit 1010.

Then, it is designed so that plural lines of the ahead-reading signal stored to the line memory 3013 will be referred to, and the distinction signal is output from the distinction signal arithmetic unit 1009.

Here, operation of the line memory 1008 is to store data in order from the scanner (the G-color sensor 1001) to the line memory area from which the data has not been taken-out, and the memory can read in the data without suspending the operation of the scanner while transmitting the read-in data to the distinction signal arithmetic unit 1009.

Besides, it can be considered to use, for example, an edge detection filter expressed by the matrix as shown in FIG. 2 as the distinction signal arithmetic unit 1009.

In an area of such an edge detection filter, it is considered to be a character area if an edge is detected, and it is considered to be a picture area otherwise.

As described above, in the image processing device according to the first embodiment of the present invention, a distinction process for referring to a wider area can be implemented by taking out the ahead-reading signal for generating the distinction signal before forming a synchronized signal sequence, and when the RGBK signal and the distinction signal are synchronously output, a necessary amount of the used line memory is mitigated so that a substantially wider area can be referred to.

That is, in the image processing device according to the first embodiment of the present invention, by implementing the necessary reference process by using the image signal output from at least one line sensor other than the last stage line sensor of the plural line sensors as the ahead-reading signal, the capacity of the used line memory can be mitigated while a substantially wider area can be referred to. As a result, referring to the wider area can be implemented with a lower cost so that the image reproducibility is improved.

Moreover, in the image processing device according to the first embodiment of the present invention, it is designed so that the output from the G-color sensor 1001 can be stored to the line memory 1008 as the ahead-reading signal before being subjected to taking synchronization at the RGBK synchronization circuit 1010 by arranging the G-color sensor 1001 at the head. Therefore, by arranging the plural line sensors so as to place the reading position of the signal to be ahead-read at the head, referring to the wider area can be implemented with lower cost concerning the desired signal as a result. Therefore, the image reproducibility is further improved.

Second Embodiment

Hereinafter, an explanation will be given of a second embodiment of the present invention with reference to the accompanying drawings.

Figure 3:
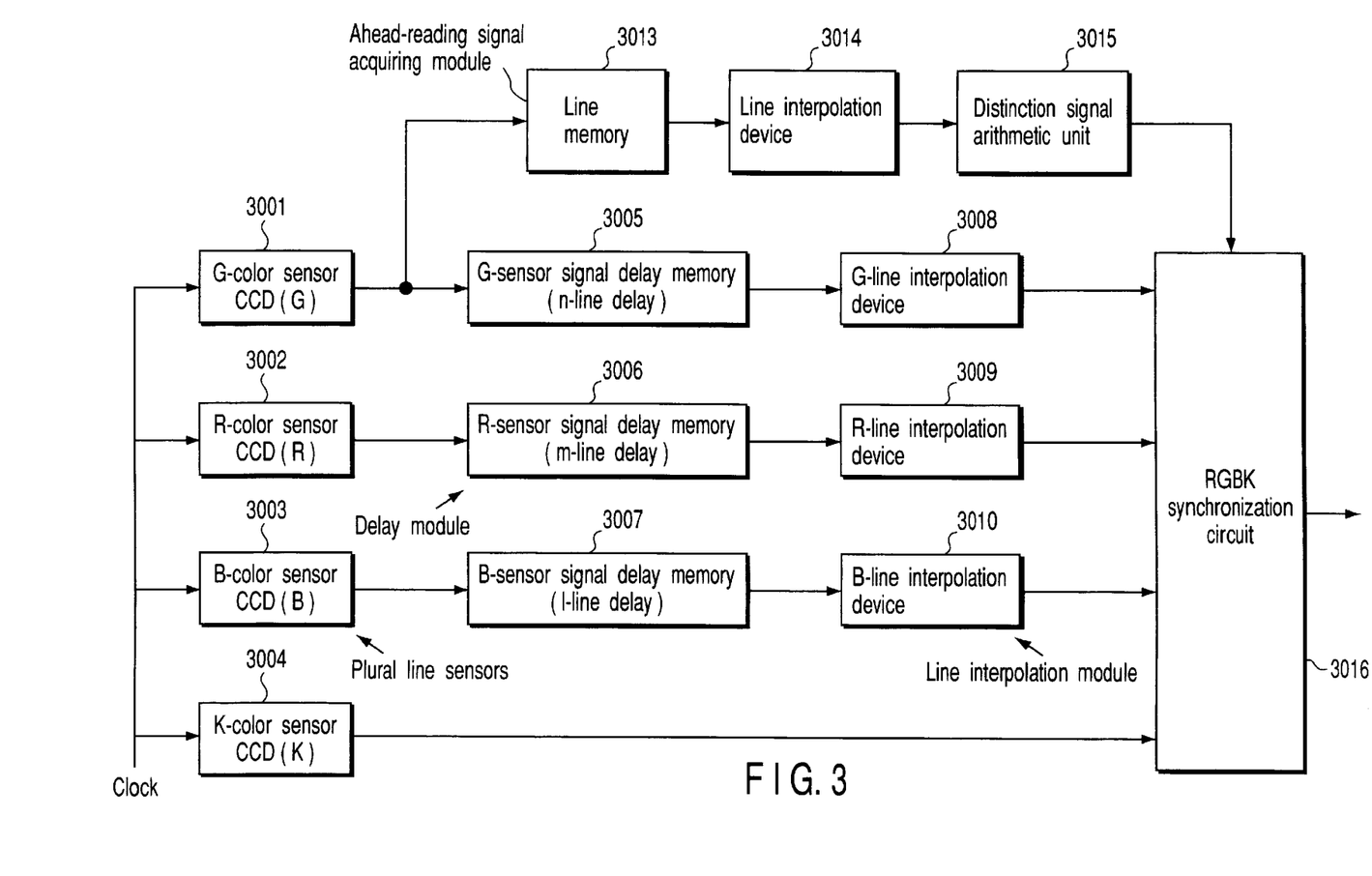
FIG. 3 is a block diagram showing a structure of a main portion of an image processing device according to a second embodiment of the present invention.

FIG. 3 is a block diagram showing a structure of a main portion of an image processing device according to the second embodiment of the present invention.

In FIG. 3, reference numeral 3001 indicates a green (G) color sensor.

Moreover, reference numeral 3002 indicates a red (R) color sensor.

Moreover, reference numeral 3003 indicates a blue (B) color sensor.

Moreover, reference numeral 3004 indicates a monochrome (K) color sensor.

It is assumed that the G-color sensor 3001, the R-color sensor 3002, the B-color sensor 3003, and the K-color sensor 3004 are respectively arranged, for example, at predetermined positions in a main body of a scanner that is not shown in the figures, in a predetermined order, with predetermined intervals, and parallel to each other, and they include, for example, a CCD line sensor that is made of charge coupled devices and an analog-to-digital converter for converting an analog signal from each CCD line sensor into a digital signal.

Then, the G-color sensor 3001, the R-color sensor 3002, the B-color sensor 3003, and the K-color sensor 3004 are to function as plural line sensors for respectively reading different lines on a manuscript that is not shown in the figures, and are driven by clocks supplied from outside with characteristics being the same as each other.

Moreover, in FIG. 3, reference numeral 3005 indicates a G-sensor signal delay memory of an n-line connected to an output end of the G-color sensor 3001.

Moreover, reference numeral 3006 indicates an R-sensor signal delay memory of an m-line connected to an output end of the R-color sensor 3002.

Moreover, reference numeral 3007 indicates a B-sensor signal delay memory of an l-line connected to an output end of the B-color sensor 3003.

The G-sensor signal delay memory 3005, the R-sensor signal delay memory 3006, and the B-sensor signal delay memory 3007 are to function as a delay module which outputs an image signal output from at least one line sensor among the plural line sensors with a delay of a number of the lines (here, it is the number of n-, m-, and l-lines in the respective delay memories, and for example, they are regulated as n=24, m=16, and l=8) according to a number of pixels that correspond to shifts of the reading positions of the plural line sensors that are regulated by the arrangement interval of the plural line sensors.

Besides, as the G-sensor signal delay memory 3005, the R-sensor signal delay memory 3006, and the B-sensor signal delay memory 3007, concretely, there can be used, for example, a delay module composed of a FIFO memory as disclosed in above-mentioned Document 1 and a selector or the like for selecting which part of sensor line data in the FIFO memory is to be output at the latter step included therein.

Moreover, in FIG. 3, reference numeral 3008 indicates a G-line interpolation device that is connected to the output end of the G-sensor signal delay memory 3005, and is for making it possible to correspond to changing the magnification as a scanner.

Moreover, reference numeral 3009 indicates an R-line interpolation device that is connected to the output end of the R-sensor signal delay memory 3006, and is for making it possible to correspond to changing the magnification as a scanner.

Moreover, reference numeral 3010 indicates a B-line interpolation device that is connected to the output end of the B-sensor signal delay memory 3007, and is for making it possible to correspond to changing the magnification as a scanner.

The G-line interpolation device 3008, the R-line interpolation device 3009, and the B-line interpolation device 3010 for making it possible to correspond to changing the magnification as a scanner are to function as a line interpolation module for implementing, on the image signal output from at least one of the plural line sensors, line interpolation in correspondence with a change of the shift of the reading position of the plural line sensors according to the reading magnification value of the manuscript.

Besides, as the G-line interpolation device 3008, the R-line interpolation device 3009, and the B-line interpolation device 3010 for making it possible to correspond to changing the magnification as a scanner, there can be used the line interpolation module composed of a multiplier for multiplying a predetermined coefficient according to the reading magnification value of the manuscript to the sensor line data of a predetermined part from the FIFO memory as the above-described delay module as disclosed in above-mentioned Document 1 and the like included therein.

Moreover, in FIG. 3, reference numeral 3013 indicates a line memory connected to the output end of the G-color sensor 3001.

The line memory 3013 functions as an ahead-reading signal outputting module which outputs the image signal output from at least one line sensor other than the last stage line sensor of the plural line sensors (the K-color sensor 3004 in this case) as an ahead-reading signal.

Moreover, in FIG. 3, reference numeral 3014 indicates a line interpolation device that is connected to the output end of the line memory 3013, and is for making it possible to correspond to changing the magnification as a scanner.

Besides, as the line interpolation device 3014 for making it possible to correspond to changing the magnification as a scanner, concretely, there can be used a line interpolation module composed of, for example, a multiplier for multiplying the predetermined coefficient according to the reading magnification value of the manuscript to the sensor line data of the predetermined part from the line memory 3013 as disclosed in above-mentioned Document 1 and the like included therein.

Moreover, in FIG. 3, reference numeral 3015 indicates a distinction signal arithmetic unit connected to the output end of the line interpolation device 3014.

The distinction signal arithmetic unit 3015 generates a distinction signal as will be described later on the basis of the image signal from the line memory 3013.

Moreover, in FIG. 3, reference numeral 3016 indicates an RGBK synchronization circuit connected to the G-line interpolation device 3008, the R-line interpolation device 3009, and the B-line interpolation device 3010, which make it possible to correspond to changing magnification as a scanner, and the respective output ends of the K-color sensor 3004 while being connected to the output end of the distinction signal arithmetic unit 3015.

The RGBK synchronization circuit 3016 takes synchronization for each pixel of the respective RGBK image signals from the G-line interpolation device 3008, the R-line interpolation device 3009, and the B-line interpolation device 3010, which make it possible to correspond to changing magnification as a scanner, and the respective output ends of the K-color sensor 3004 while outputting RGBK synchronized signal lines in a line unit resulting from adding the distinction signal from the output end of the distinction signal arithmetic unit 3015 as a header to the synchronized signal in each pixel unit.

In the image processing device according to the second embodiment of the present invention that is composed as above, the output from the G-color sensor 3001 is stored to the line memory 3013 as the ahead-reading signal before being subjected to taking synchronization at the RGBK synchronization circuit 3016.

Then, it is designed so that plural lines of the ahead-reading signal stored to the line memory 3013 will be referred to, and the line interpolation will be implemented by the line interpolation device 3014 which makes it possible to correspond to changing magnification as a scanner, and then, the distinction signal is output from the distinction signal arithmetic unit 3015.

Here, operation of the line memory 3013 is to store data in order from the scanner (the G-color sensor 3001) to the line memory area from which the data has not been taken out, and the memory can read in the data without suspending the operation of the scanner while transmitting the read-in data to the distinction signal arithmetic unit 3015 via the line interpolation device 3014.

Besides, it can be considered to use, for example, an edge detection filter expressed by the matrix as shown in FIG. 2 as the distinction signal arithmetic unit 3015.

In an area of such an edge detection filter, it is considered to be a character area if an edge is detected, and it is considered to be a picture area otherwise.

As described above, in the image processing device according to the second embodiment of the present invention, a distinction process for referring to a wider area can be implemented by taking out the ahead-reading signal for generating the distinction signal before forming a synchronized signal sequence, and when the RGBK signal and the distinction signal are synchronously output, a necessary amount of the used line memory is mitigated so that a substantially wider area can be referred to.

That is, in the image processing device according to the second embodiment of the present invention, by implementing the necessary reference process by using the image signal output from at least one line sensor other than the last stage line sensor of the plural line sensors as the ahead-reading signal, the capacity of the used line memory can be mitigated while a substantially wider area can be referred to. As a result, referring to the wider area can be implemented with a lower cost so that the image reproducibility is improved.

Then, in the image processing device according to the second embodiment of the present invention, as shown in FIG. 3, by comprising the G-line interpolation device 3008, the R-line interpolation device 3009, and the B-line interpolation device 3010, which make it possible to correspond to changing magnification as a scanner, and the line interpolation device 3014, an area of the same width can always be referred to with a lower cost regardless of the magnification of the scanner at the time of changing the magnification, and the area image reproducibility is improved.

That is, in the image processing device according to the second embodiment of the present invention, even when position shift of the pixel changes due to changing the scanner magnification, high-definition image reproduction is realized by referring to the area of the same width as an equally magnified distinction signal for the ahead-reading signal of the K-signal in an area with a little memory.

Third Embodiment

Hereinafter, an explanation will be given of a third embodiment of the present invention with reference to the accompanying drawings.

Figure 4:
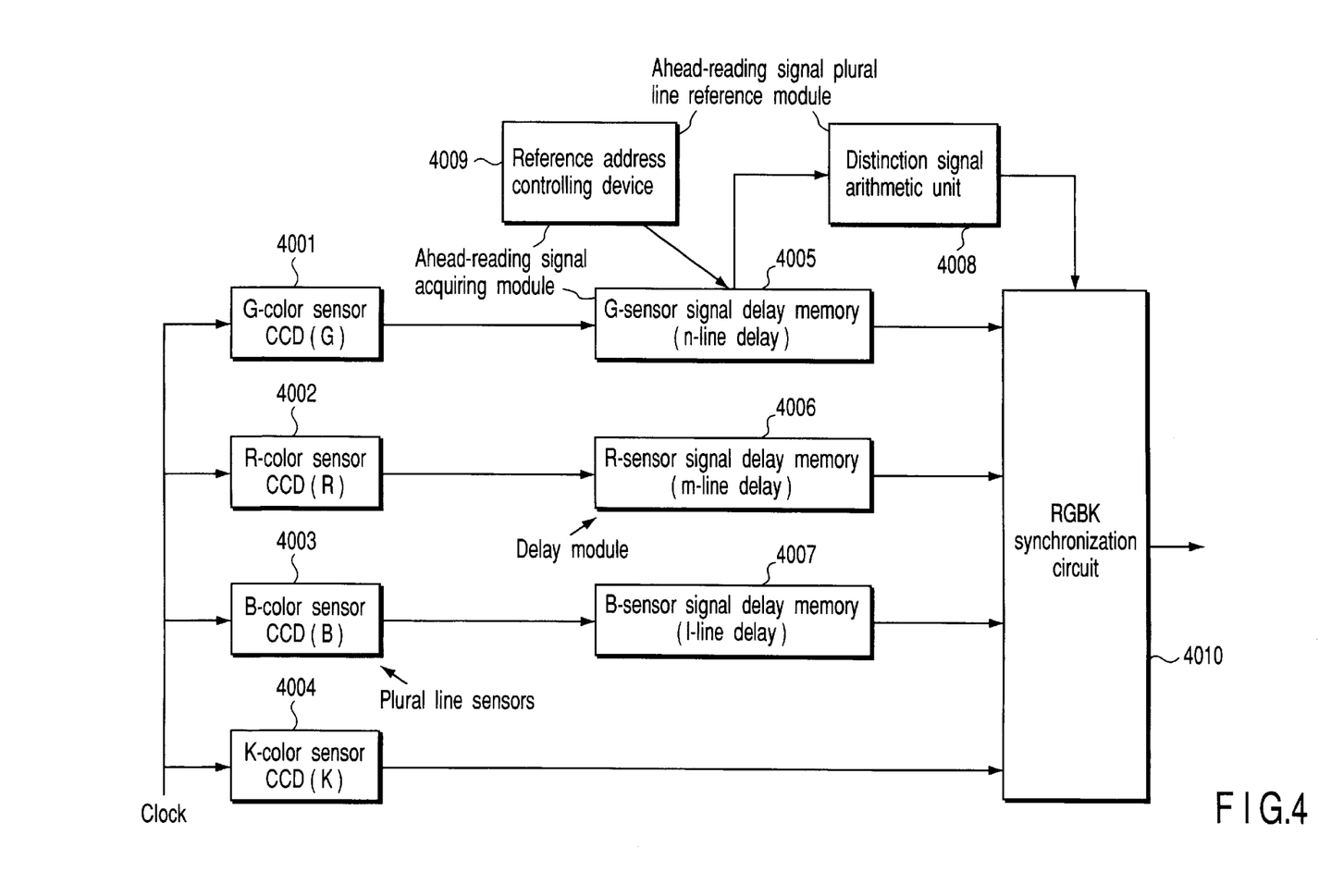
FIG. 4 is a block diagram showing a structure of a main portion of an image processing device according to a third embodiment of the present invention.

FIG. 4 is a block diagram showing a structure of a main portion of an image processing device according to the third embodiment of the present invention.

In FIG. 4, reference numeral 4001 indicates a green (G) color sensor.

Moreover, reference numeral 4002 indicates a red (R) color sensor.

Moreover, reference numeral 4003 indicates a blue (B) color sensor.

Moreover, reference numeral 4004 indicates a monochrome (K) color sensor.

It is assumed that the G-color sensor 4001, the R-color sensor 4002, the B-color sensor 4003, and the K-color sensor 4004 are respectively arranged, for example, at predetermined positions in a main body of a scanner that is not shown in the figures, in a predetermined order, with predetermined intervals, and parallel to each other, and they include, for example, a CCD line sensor that is made of charge coupled devices and an analog-to-digital converter for converting an analog signal from each CCD line sensor into a digital signal.

Then, the G-color sensor 4001, the R-color sensor 4002, the B-color sensor 4003, and the K-color sensor 4004 are to function as plural line sensors for respectively reading different lines on a manuscript that is not shown in the figures, and are driven by clocks supplied from outside with characteristics being the same as each other.

Moreover, in FIG. 4, reference numeral 4005 indicates a G-sensor signal delay memory of an n-line connected to an output end of the G-color sensor 4001.

Moreover, reference numeral 4006 indicates an R-sensor signal delay memory of an m-line connected to an output end of the R-color sensor 4002.

Moreover, reference numeral 4007 indicates a B-sensor signal delay memory of an l-line connected to an output end of the B-color sensor 4003.

The G-sensor signal delay memory 4005, the R-sensor signal delay memory 4006, and the B-sensor signal delay memory 4007 are to function as a delay module which outputs an image signal output from at least one line sensor among the plural line sensors with a delay of a number of the lines (here, it is the number of n-, m-, and l-lines in the respective delay memories, and for example, they are regulated as n=24, m=16, and l=8) according to a number of pixels that correspond to shifts of the reading positions of the plural line sensors that are regulated by the arrangement interval of the plural line sensors.

Besides, as the G-sensor signal delay memory 4005, the R-sensor signal delay memory 4006, and the B-sensor signal delay memory 3007, concretely, there can be used, for example, the delay module composed of a FIFO memory as disclosed in the above-mentioned Document 1 and a selector and the like for selecting which part of sensor line data in the FIFO memory is to be output at the latter step included therein.

Moreover, in FIG. 4, reference numeral 4008 indicates a distinction signal arithmetic unit connected to the G-sensor signal delay memory 4005.

The distinction signal arithmetic unit 4008 generates a distinction signal as will be described later on the basis of the image signal from the G-sensor signal delay memory 4005.

Moreover, the distinction signal arithmetic unit 4008 functions as a part of an ahead-reading signal plural line reference module that can refer to the plural lines of the ahead-reading signal output by the ahead-reading signal outputting module on the basis of the image signal delayed by the delay module.

Moreover, in FIG. 4, reference numeral 4010 indicates an RGBK synchronization circuit connected to the G-sensor signal delay memory 4005, the R-sensor signal delay memory 4006, the B sensor signal delay memory 4007, and the respective output ends of the K-color sensor 4004 while being connected to the output end of the distinction signal arithmetic unit 4008.

The RGBK synchronization circuit 4010 takes synchronization for each pixel of the respective RGBK image signals from the G-sensor signal delay memory 4005, the R-sensor signal delay memory 4006, the B-sensor signal delay memory 4007, and the respective output ends of the K-color sensor 4004 while outputting RGBK synchronized signal lines in a line unit resulting from adding the distinction signal from the output end of the distinction signal arithmetic unit 4009 as a header to the synchronized signal in each pixel unit.

Moreover, in FIG. 4, reference numeral 4009 indicates the reference address controlling device connected to the G-sensor signal delay memory 4005.

By directly referring to the G-sensor signal delay memory 4005 by using the reference address controlling device 4009, the delay memory and the memory for the distinction signal generation can be communalized and the line memory 1008 in the first embodiment can be omitted.

That is, the image signal stored to the G-sensor signal delay memory 4005 is referred to by the reference address controlling device 4009 as the ahead-reading signal as will be described later.

Here, an explanation will be given of the operation of the reference address controlling device 4009.

For example, in the case where an attention line is the line stored at the N-th address of the G-sensor signal delay memory 4005, and a range of the referred area is from the previous line to the next line of the attention line, the reference address controlling device 4009 controls the address of the G-sensor signal delay memory 4005 so as to output the lines at the (N−1)-th, the N-th, and the (N+1)-th addresses.

Then, the reference address controlling device 4009 functions as a part of the ahead-reading signal plural line reference module that can refer to the plural lines of the ahead-reading signal output by the ahead-reading signal outputting module on the basis of the image signal delayed by the delay module.

In the image processing device according to the third embodiment of the present invention that is composed as above, it is designed so that the output from the G-color sensor 4001 will be stored to the G-sensor signal delay memory 4005 as the ahead-reading signal before being subjected to taking synchronization at the RGBK synchronization circuit 4016 and plural lines thereof will be referred to under the control by the reference address controlling device 4009, and the distinction signal will be output from the distinction signal arithmetic unit 4008.

Here, operation of the G-sensor signal delay memory 4005 is to store data in order from the scanner (the G-color sensor 4001) to a line memory area from which the data has not been taken out, and the memory can read in the data without suspending the operation of the scanner while transmitting the read-in data to the distinction signal arithmetic unit 4008.

In this manner, in the image processing device according to the third embodiment of the present invention, by communalizing the delay memory for positioning the RGBK and the memory element for referring to the wide range for the distinction signal generation, the reference of the plural lines can be implemented without using the line memory as described in the first embodiment.

Moreover, in the image processing device according to the third embodiment of the present invention composed as above, referring to the wide area with a lower cost can be realized by referring to the delay memory without using the line memory.

That is, in the image processing device according to the third embodiment of the present invention, by implementing the necessary reference process by using the image signal output from at least one line sensor other than the last stage line sensor of the plural line sensors as the ahead-reading signal, the capacity of the memory used for the reference process can be mitigated while a substantially wider area can be referred to. As a result, referring to the wider area can be implemented with a lower cost so that the image reproducibility is improved.

Fourth Embodiment

Hereinafter, an explanation will be given of a fourth embodiment of the present invention with reference to the accompanying drawings.

Figure 5:
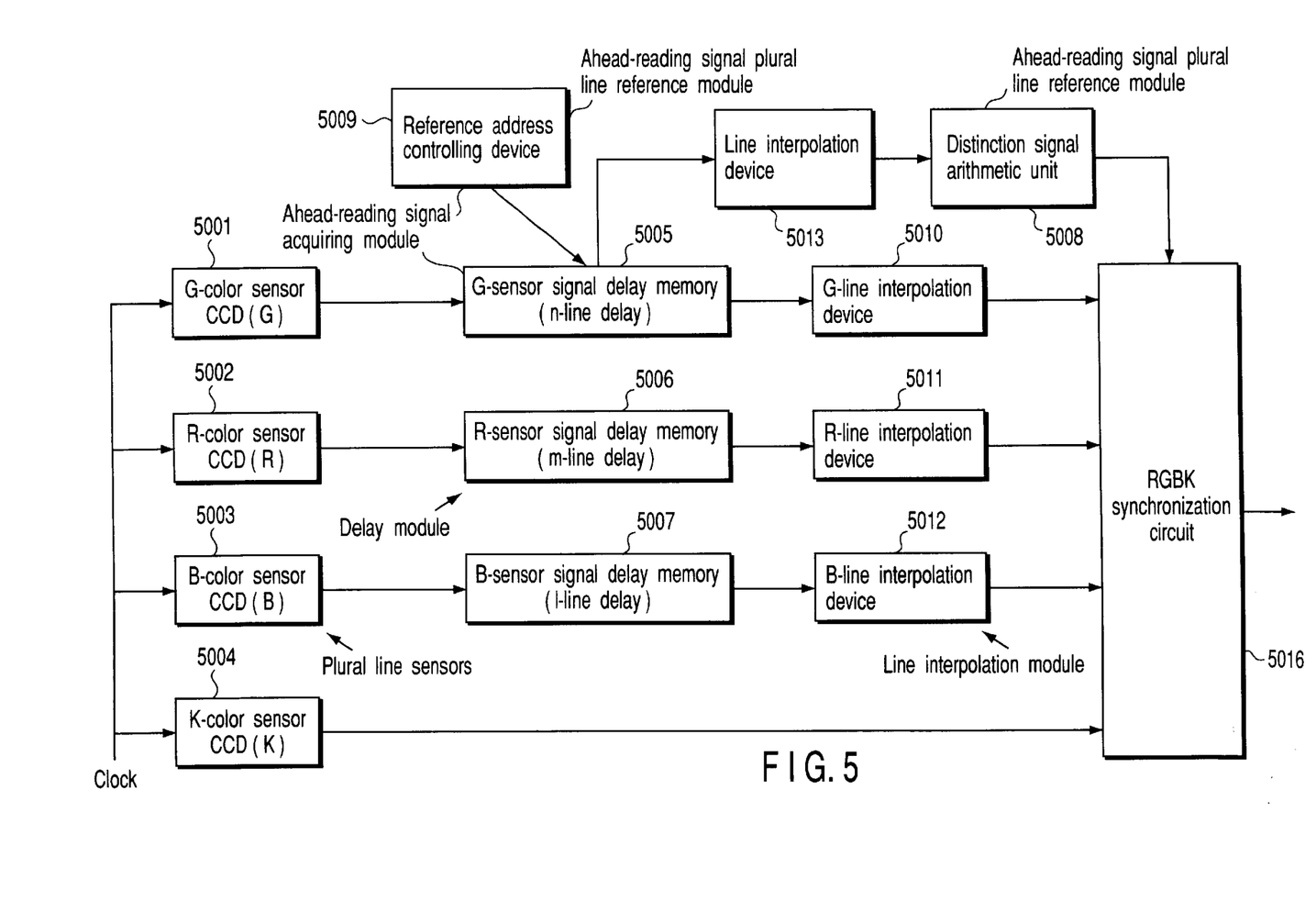
FIG. 5 is a block diagram showing a structure of a main portion of an image processing device according to a fourth embodiment of the present invention.

FIG. 5 is a block diagram showing a structure of a main portion of an image processing device according to the fourth embodiment of the present invention.

In FIG. 5, reference numeral 5001 indicates a green (G) color sensor.

Moreover, reference numeral 5002 indicates a red (R) color sensor.

Moreover, reference numeral 5003 indicates a blue (B) color sensor.

Moreover, reference numeral 5004 indicates a monochrome (K) color sensor.

It is assumed that the G-color sensor 5001, the R-color sensor 5002, the B-color sensor 5003, and the K-color sensor 5004 are respectively arranged, for example, at predetermined positions in a main body of a scanner that is not shown in the figures, in a predetermined order, with predetermined intervals, and parallel to each other, and they include, for example, a CCD line sensor that is made of charge coupled devices and an analog-to-digital converter for converting an analog signal from each CCD line sensor into a digital signal.

Then, the G-color sensor 5001, the R-color sensor 5002, the B-color sensor 5003, and the K-color sensor 5004 are to function as plural line sensors for respectively reading different lines on a manuscript that is not shown in the figures, and are driven by clocks supplied from outside with characteristics being the same as each other.

Moreover, in FIG. 5, reference numeral 5005 indicates a G-sensor signal delay memory of an n-line connected to an output end of the G-color sensor 5001.

Moreover, reference numeral 5006 indicates an R-sensor signal delay memory of an m-line connected to an output end of the R-color sensor 5002.

Moreover, reference numeral 5007 indicates a B-sensor signal delay memory of an l-line connected to an output end of the B-color sensor 5003.

The G-sensor signal delay memory 5005, the R-sensor signal delay memory 5006, and the B-sensor signal delay memory 5007 are to function as a delay module which outputs an image signal output from at least one line sensor among the plural line sensors with a delay of a number of the lines (here, it is the number of n-, m-, and l-lines in the respective delay memories, and for example, they are regulated as n=24, m=16, and l=8) according to a number of pixels that correspond to shifts of the reading positions of the plural line sensors that are regulated by the arrangement interval of the plural line sensors.

Besides, as the G-sensor signal delay memory 5005, the R-sensor signal delay memory 5006, and the B-sensor signal delay memory 5007, concretely, there can be used, for example, a delay module composed of a FIFO memory as disclosed in above-mentioned Document 1 and a selector and the like for selecting which part of sensor line data in the FIFO memory is to be output at the latter step included therein.

Moreover, in FIG. 5, reference numeral 5010 indicates a G-line interpolation device that is connected to the output end of the G-sensor signal delay memory 5005, and is for making it possible to correspond to changing the magnification as a scanner. Moreover, reference numeral 5011 indicates an R-line interpolation device that is connected to the output end of the R-sensor signal delay memory 5006, and is for making it possible to correspond to changing the magnification as a scanner.

Moreover, reference numeral 5012 indicates a B-line interpolation device that is connected to the output end of the B-sensor signal delay memory 5007, and is for making it possible to correspond to changing the magnification as a scanner.

The G-line interpolation device 5010, the R-line interpolation device 5011, and the B-line interpolation device 5012 for making it possible to correspond to changing the magnification as a scanner are to function as a line interpolation module for implementing, on the image signal output from at least one of the plural line sensors, line interpolation in correspondence with a change of the shift of the reading position of the plural line sensors according to the reading magnification value of the manuscript.

Besides, as the G-line interpolation device 5010, the R-line interpolation device 5011, and the B-line interpolation device 5012 for making it possible to correspond to changing the magnification as a scanner, there can be used a line interpolation module composed of a multiplier for multiplying a predetermined coefficient according to the reading magnification value of the manuscript to the sensor line data of a predetermined part from the FIFO memory as the above-described delay module as disclosed in above-mentioned Document 1 and the like included therein.

Moreover, in FIG. 5, reference numeral 5013 indicates a line interpolation device connected to a G-sensor signal delay memory 5005 for making it possible to correspond to changing magnification as a scanner.

The line interpolation device 5013 functions as an ahead-reading signal acquiring module which acquires the image signal output from at least one line sensor besides the line sensor at the last step among the plural line sensors (the K-color sensor 5004 in this case) as an ahead-reading signal.

Moreover, the line interpolation device 5013 functions as a part of an ahead-reading signal plural line reference module that can refer to the plural lines of the ahead-reading signal acquired by the ahead-reading signal acquiring module on the basis of the image signal delayed by the delay module.

Besides, as the line interpolation device 5013 for making it possible to correspond to changing the magnification as a scanner, concretely, there can be used a line interpolation module composed of, for example, a multiplier for multiplying the predetermined coefficient according to the reading magnification value of the manuscript to the sensor line data of the predetermined part from the above-described G-sensor signal delay memory 5005 as disclosed in above-mentioned Document 1 and the like included therein.

Moreover, in FIG. 5, reference numeral 5008 indicates a distinction signal arithmetic unit connected to the output end of the line interpolation device 5013.

The distinction signal arithmetic unit 5008 generates a distinction signal as will be described later on the basis of the image signal from the above-mentioned G-sensor signal delay memory 5005.

Moreover, the distinction signal arithmetic unit 5008 functions as a part of the ahead-reading signal plural line reference module that can refer to the plural lines of the ahead-reading signal acquired by the ahead-reading signal acquiring module on the basis of the image signal delayed by the delay module.

Moreover, in FIG. 5, reference numeral 5016 indicates an RGBK synchronization circuit connected to the G-line interpolation device 5010, the R-line interpolation device 5011, and the B-line interpolation device 5012, which make it possible to correspond to changing magnification as a scanner, and the respective output ends of the K-color sensor

5004 while being connected to the output end of the distinction signal arithmetic unit 5008.

The RGBK synchronization circuit 5016 takes synchronization for each pixel of the respective RGBK image signals from the G-line interpolation device 5010, the R-line interpolation device 5011, and the B-line interpolation device 5012, which make it possible to correspond to changing magnification as a scanner, and the respective output ends of the K-color sensor 5004 while outputting RGBK synchronized signal lines in a line unit resulting from adding the distinction signal from the output end of the distinction signal arithmetic unit 5008 as a header to the synchronized signal in each pixel unit.

Moreover, in FIG. 5, reference numeral 5009 indicates the reference address controlling device connected to the G-sensor signal delay memory 5005.

By directly referring to plural lines in the G-sensor signal delay memory 5005 by using a reference address controlling device 5009, the delay memory and the memory for the distinction signal generation can be communalized and the line memory 1008 in the first embodiment can be omitted.

That is, the image signal stored to the G-sensor signal delay memory 5005 is referred to by the reference address controlling device 5009 as the ahead-reading signal as will be described later.

Here, an explanation will be given of the operation of the reference address controlling device 5009.

For example, in the case where an attention line is the line stored at the N-th address of the G-sensor signal delay memory 5005, and a range of the referred area is from the previous line to the next line of the attention line, the reference address controlling device 5009 controls the address of the G-sensor signal delay memory 5005 so as to output the lines at the (N−1)-th, the N-th, and the (N+1)-th addresses.

Then, the reference address controlling device 5009 functions as a part of the ahead-reading signal plural line reference module that can refer to the plural lines of the ahead-reading signal acquired by the ahead-reading signal acquiring module on the basis of the image signal delayed by the delay module.

In the image processing device according to the fourth embodiment of the present invention that is composed as above, it is designed so that the output from the G-color sensor 5001 will be stored to the G-sensor signal delay memory 5005 as the ahead-reading signal before being subjected to taking synchronization at the RGBK synchronization circuit 5016 and plural lines thereof will be referred to under the control by the reference address controlling device 5009, and the distinction signal will be output from the distinction signal arithmetic unit 5008 after line interpolation is implemented by the line interpolation device 5013 which makes it possible to correspond to changing the magnification as a scanner.

Here, operation of the G-sensor signal delay memory 5005 is to store data in order from the scanner (the G-color sensor 5001) to the line memory area from which the data has not been taken out, and the memory can read in the data without suspending the operation of the scanner while transmitting the read-in data to the distinction signal arithmetic unit 5008 via the line interpolation device 5013.

Besides, it can be considered to use, for example, an edge detection filter expressed by the matrix as shown in FIG. 2 as the distinction signal arithmetic unit 5008.

In an area of such an edge detection filter, it is considered to be a character area if an edge is detected, and it is considered to be a picture area otherwise.

As described above, in the image processing device according to the fourth embodiment of the present invention, a distinction process for referring to a wider area can be implemented by taking out the ahead-reading signal for generating the distinction signal before forming a synchronized signal sequence, and when the RGBK signal and the distinction signal are synchronously output, a necessary amount of the used memory is mitigated so that a substantially wider area can be referred to.

That is, in the image processing device according to the fourth embodiment of the present invention, by implementing the necessary reference process by using the image signal output from at least one line sensor other than the last stage line sensor of the plural line sensors as the ahead-reading signal, the capacity of the memory used for the reference process can be mitigated while a substantially wider area can be referred to. As a result, referring to the wider area can be implemented with a lower cost so that the image reproducibility is improved.

Then, in the image processing device according to the fourth embodiment of the present invention, as shown in FIG. 5, by comprising the G-line interpolation device 5010, the R-line interpolation device 5011, and the B-line interpolation device 5012, which make it possible to correspond to changing magnification as a scanner, and the line interpolation device 5013, an area of the same width can always be referred to with a lower cost regardless of the magnification of the scanner at the time of changing the magnification, and the area image reproducibility is improved.

That is, in the image processing device according to the fourth embodiment of the present invention, even when position shift of the pixels changes due to changing the scanner magnification, high-definition image reproduction is realized by referring to the area of the same width as an equally magnified distinction signal for the ahead-reading signal of the K-signal in an area with a little memory.

In this manner, in the image processing device according to the fourth embodiment of the present invention, by communalizing the delay memory for positioning the RGBK and the memory element for referring to the wide range for the distinction signal generation, the reference of the plural lines can be implemented without using the line memory as described in the first embodiment.

Moreover, in the image processing device according to the fourth embodiment of the present invention composed as above, referring to the wide area with a lower cost can be realized by referring to the delay memory without using the line memory.

Accordingly, as explained above, according to the present invention, there can be provided an image processing device and the controlling method thereof which are designed so that, when an image on the manuscript is read by using plural line sensors for RGB arranged parallel to each other respectively, by implementing the necessary reference process by using at least one line signal as the ahead-reading signal, the capacity of the used line memory can be mitigated while a substantially wider area can be referred to in order to improve the image reproducibility.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:

plural line sensors arranged parallel to each other in a predetermined order and with a predetermined interval between a foremost position and a backmost position, which read different lines on a manuscript, respectively;

delay modules which output respective image signals output from the plural line sensors, with a delay for a number of lines according to a number of pixels which corresponds to a shift of a reading position of each of the plural line sensors;

an ahead-reading signal acquiring module which acquires the image signal output from at least one line sensor other than a line sensor of the plural line sensors which is arranged at the backmost position as an ahead-reading signal;

a distinction signal arithmetic module which computes a predetermined distinction signal in accordance with the ahead-reading signal acquired by the ahead-reading signal acquiring module; and a synchronization module which synchronizes, in units of pixels, a plurality of image signals output from the plural line sensors having shifts of their reading positions corrected by the delay modules, and outputting, in units of lines, synchronization signal lines each having the predetermined distinction signal serving as a header.

2. An image processing device according to claim 1, wherein the ahead-reading signal acquiring module acquires, as the ahead-reading signal, an image signal output from a line sensor of the plural line sensors which is arranged at the foremost position.

3. An image processing device according to claim 1, wherein said device further comprises a plurality of line interpolation modules which implement line interpolation of the respective image signals output from the plural line sensors in correspondence with changes of the shifts of the reading positions of the plural line sensors according to a reading magnification value of the manuscript.

4. An image processing device according to claim 1, wherein the delay modules include a first delay module which outputs an image signal output from at least one line sensor other than a line sensor of the plural line sensors arranged at the backmost position, with a delay for a number of lines according to the number of pixels which corresponds to the shifts of reading positions of the plural line sensors; and the ahead-reading signal acquiring module acquires, as the ahead-reading signal, an output from the first delay module while including a line reference module which enables reference to plural lines of the acquired ahead-reading signal.

5. An image processing device comprising:

plural line sensors arranged parallel to each other in a predetermined order and with a predetermined interval between a foremost position and a backmost position, which read different lines on a manuscript, respectively;

a plurality of delay means for outputting respective image signals output from the plural line sensors, with a delay for a number of lines according to a number of pixels which corresponds to a shift of a reading position of each of the plural line sensors;

ahead-reading signal acquiring means for acquiring the image signal output from at least one line sensor other than a line sensor of the plural line sensors which is arranged at the backmost position, as an ahead-reading signal;

distinction signal arithmetic means for computing a predetermined distinction signal in accordance with the ahead-reading signal acquired by the ahead-reading signal acquiring means; and synchronization means for synchronizing, in units of pixels, a plurality of image signals output form the plural line sensors having shifts of their reading positions corrected by the delay means, and outputting, in units of lines, synchronization signal lines each having the predetermined distinction signal computed by the distinction signal arithmetic means, the predetermined distinction signal serving as a header.

6. An image processing device according to claim 5, wherein the ahead-reading signal acquiring means acquires, as the ahead-reading signal, an image signal output from a line sensor of the plural line sensors which is arranged at the foremost position.

7. An image processing device according to claim 5, wherein there is further provided a plurality of line interpolation means for implementing line interpolation of the respective image signals output from the plural line sensors in correspondence with changes of the shift of the reading positions of the plural line sensors according to a reading magnification value of the manuscript.

8. An image processing device according to claim 5, wherein the plurality of delay means include first delay means for outputting an image signal output from at least one line sensor other than a line sensor of the plural line sensors arranged at the backmost position, with a delay for a number of lines according to the number of pixels which corresponds to the shifts of reading positions of the plural line sensors; and the ahead-reading signal acquiring means acquires, as the ahead-reading signal, an output from the first delay means while including a line reference means for enabling reference to plural lines of the acquired ahead-reading signal.

9. A controlling method of an image processing device comprising plural line sensors arranged parallel to each other in a predetermined order and with a predetermined interval between a foremost position and a backmost position, which read different lines on a manuscript, respectively, comprising:

outputting each image signal output from the plural line sensors with a delay for a number of lines according to a number of pixels which corresponds to shifts of reading positions of the plural line sensors;

acquiring the image signal output from at least one line sensor other than a line sensor of the plural line sensors which is arranged at a backmost position, as an ahead-reading signal;

computing a predetermined distinction signal in accordance with the ahead-reading signal; and synchronizing, in units of pixels, a plurality of image signals output from the plural line sensors having shifts of their reading positions corrected, and outputting, in units of lines, synchronization signal lines each having the computed predetermined distinction signal, the predetermined distinction signal serving as a header.

10. A controlling method of the image processing device according to claim 9, wherein an image signal output from a line sensor of the plural line sensors which is arranged at the foremost position is acquired as the ahead-reading signal.

11. A controlling method of the image processing device according to claim 9, further comprising:

implementing line interpolation of the respective image signal output from the plural line sensors in correspondence with changes of the shifts of the reading positions of the plural line sensors according to a reading magnification value of the manuscript.

12. A controlling method of the image processing device according to claim 9, wherein the delay is performed by a first delay element which outputs the image signal outputted from at least one line sensor other than the line sensor of the plural line sensors arranged at the backmost position, with a delay for a number of lines according to a number of pixels which corresponds to the shifts of reading positions of the plural line sensors; and the ahead-reading signal acquisition is performed by acquiring the ahead-reading signal from the first delay element, an ahead-reading signal plural-line reference element which enables reference to plural lines of the acquired ahead-reading signal being included.

* * * * *